US012744429B2

(12) United States Patent
Kordvee et al.

(10) Patent No.: US 12,744,429 B2
(45) Date of Patent: Sep. 22, 2026

(54) SPRAY OIL COOLING DEVICE FOR A STATOR CORE PERIPHERY

(71) Applicant: Bayerische Motoren Werke Aktiengesellschaft, Munich (DE)

(72) Inventors: Konstantin Kordvee, Munich (DE); Benjamin Krank, Munich (DE); Matthias Lepschi, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 197 days.

(21) Appl. No.: 18/721,236

(22) PCT Filed: Jan. 10, 2023

(86) PCT No.: PCT/EP2023/050467
§ 371 (c)(1),
(2) Date: Jun. 18, 2024

(87) PCT Pub. No.: WO2023/143906
PCT Pub. Date: Aug. 3, 2023

(65) Prior Publication Data

US 2025/0062661 A1 Feb. 20, 2025

(30) Foreign Application Priority Data

Jan. 27, 2022 (DE) ..................... 10 2022 101 887.3

(51) Int. Cl.
*H02K 9/19* (2006.01)
*H02K 7/00* (2006.01)

(52) U.S. Cl.
CPC ............... *H02K 9/19* (2013.01); *H02K 7/006* (2013.01); *H02K 2209/00* (2013.01)

(58) Field of Classification Search
CPC ....... H02K 9/19; H02K 7/006; H02K 2209/00
See application file for complete search history.

(56) References Cited

U.S. PATENT DOCUMENTS

2011/0248507 A1* 10/2011 Petersen .................. H02K 1/20 290/55
2014/0217842 A1* 8/2014 Kikuchi ................... H02K 9/19 310/54

(Continued)

FOREIGN PATENT DOCUMENTS

CN 214755965 U 11/2021
DE 10 2012 019 749 A1 4/2014

(Continued)

OTHER PUBLICATIONS

English translation of JP-2012191719-A. (Year: 2012).*

(Continued)

*Primary Examiner* — Sean Gugger
(74) *Attorney, Agent, or Firm* — Crowell & Moring LLP

(57) ABSTRACT

A spray oil cooling device for a stator core periphery of an electric drive unit in a motor vehicle comprising an oil pump for providing a cooling oil mass flow and an oil line for guiding the cooling oil mass flow starting from the oil pump to at least one first oil spray area at stator winding heads of a first stator end face, and at least one second oil spray area at stator winding heads of a second stator end face, wherein the oil line is designed to guide the cooling oil mass flow between the first and the second oil spray area, remote from a stator core cooling sleeve.

19 Claims, 3 Drawing Sheets

(56) References Cited

U.S. PATENT DOCUMENTS

| | | | | |
|---|---|---|---|---|
| 2014/0339933 | A1* | 11/2014 | Hossain | H02K 9/00 310/53 |
| 2019/0291570 | A1 | 9/2019 | Tang et al. | |
| 2021/0257878 | A1 | 8/2021 | Kim et al. | |
| 2021/0313862 | A1* | 10/2021 | Franck | H02K 5/203 |

FOREIGN PATENT DOCUMENTS

| | | | |
|---|---|---|---|
| DE | 10 2014 106 469 | A1 | 11/2014 |
| DE | 10 2018 121 203 | A1 | 3/2020 |
| EP | 2 760 113 | A1 | 7/2014 |
| JP | 2012191719 | A | * 10/2012 |
| JP | 2020-61859 | A | 4/2020 |
| WO | WO 2020/069316 | A1 | 4/2020 |

OTHER PUBLICATIONS

International Search Report (PCT/ISA/210) issued in PCT Application No. PCT/EP2023/050467 dated Apr. 13, 2023 with English translation (7 pages).

German-language Written Opinion (PCT/ISA/237) issued in PCT Application No. PCT/EP2023/050467 dated Apr. 13, 2023 with English translation (10 pages).

German-language Office Action issued in German Application No. 10 2022 101 887.3 dated Nov. 17, 2022 (6 pages).

* cited by examiner

SPRAY OIL COOLING DEVICE FOR A STATOR CORE PERIPHERY

BACKGROUND AND SUMMARY

This disclosure relates to a spray oil cooling device for a stator core periphery of an electric drive unit in a motor vehicle, and to an electric drive unit.

Currently, there is great interest in motor vehicles which can be powered electrically, for example, electric or hybrid vehicles. Such motor vehicles usually have one or two or more electric drive units. A drive unit has, for example, an electric motor with a stator assembly and a rotor assembly, an output transmission, connected to the latter via the rotor shaft, for transmitting and/or converting the drive torque or the rotor speed.

Often, these components are arranged inside a jointly formed housing interior of a housing of the drive unit, and have to be cooled there in many operating conditions, in particular, while driving.

The stator core outer shell of the electric drive motor can typically be cooled indirectly from a housing shell in which it is accommodated. Direct and indirect cooling alternatives are already known from the prior art for cooling the other drive components arranged in the housing, referred to below together also as the stator core periphery.

Included in the direct cooling alternatives for the electric motor is, for example, the applying or spraying of oil droplets onto winding heads of windings of a stator and/or rotor of the electric motor, wherein the stator core is also cooled at the housing by way of this oil cooling.

Against this background, an object of the disclosure is to improve cooling of an electric drive unit in a motor vehicle.

According to one aspect, a spray oil cooling device for a stator periphery of an electric drive unit with an electric drive motor in a motor vehicle is disclosed, having (a) an oil pump for supplying a cooling oil mass flow; and, (b) an oil line for routing the cooling oil mass flow starting from the oil pump to at least one first oil spraying region at stator winding heads of a first stator end side, and at least one second oil spraying region at stator winding heads of a second stator end side, wherein the oil line is configured to route the cooling oil mass flow between the first and the second oil spraying region away from a stator core cooling shell, in particular, thus spatially separated therefrom, in particular, past the stator core cooling shell.

Because the stator core cooling shell and the cooling of the stator core periphery, in particular, the stator winding heads and, if provided, further drive components, are configured separately, partial load cooling primarily over the stator core and full load cooling additionally over the stator core periphery can be decoupled.

According to a further aspect, an electric drive unit for a motor vehicle is disclosed, having an electric drive motor and a stator housing inside which a stator core and a stator core periphery of the electric drive motor are arranged, having a spray oil cooling device according to an embodiment of the disclosure.

According to one embodiment, the stator core periphery comprises the winding heads of the stator and/or an output transmission of the electric drive unit, and the spray oil cooling device is configured to cool the stator core periphery by way of spray oil.

According to one embodiment, the output transmission has a first gearing and/or a second gearing and/or a differential gear unit.

The disclosure is based, inter alia, on the idea of separating water shell cooling of the stator core shell (e.g., stator core cooling shell) and spray oil cooling of the other components in the housing interior of the housing of the drive unit, referred to in this document jointly as the stator core periphery, in order consequently to enable both efficient partial load cooling and sufficient full load cooling.

The disclosure is now based inter alia on the idea, in the case of such a combination of cooling circuits with different coolants, of configuring the cooling oil circuit with a separate line partially or completely away from the housing, and thus supplying a more robust overall system, by the risk of crosstalk between coolant lines for different coolants being avoided.

According to one embodiment, the oil line is designed as a tube separate from a stator housing and/or a stator sleeve and/or the stator core, in particular thus the line cross-section of the oil line, at least apart from connection points or wall openings, is not excluded from the stator housing and/or the stator sleeve and/or the stator core.

By separating media in the different cooling circuits for the stator core and the periphery arranged in the housing of the drive unit, the risk of crosstalk can be reduced, which is relevant in particular in the case of the use of different coolants, for example cooling oil and cooling water, because otherwise irreparable damage could occur.

Simplified installation is also connected therewith, in particular by a reduction in the forces needed to install a stator sleeve which may be used, depending on the design, by virtue of avoiding the use of additional O-rings for sealing.

In addition, routing the oil line in separate tubes is the better solution in terms of a low overall weight of the drive unit because routing in the housing entails higher material usage in the surrounding area, possibly even a greater housing dimension.

According to one embodiment, the oil line has: (i) a first line branch which is configured to route cooling oil from the oil pump to the first oil spraying region; and/or, (ii) a second line branch which branches off from the first line branch and is configured to route cooling oil to the second oil spraying region through an axial region of the stator core, wherein the second line branch is designed, in a stator core passage region (e.g., axial region of the stator core) or completely, in particular apart from connection elements, as a hollow tube with a wall thickness which is less than the cross-section of the oil line in the second line branch. A weight-optimized embodiment of the second line branch can thus be supplied.

According to one embodiment: (i) the second line branch runs in a stator core passage region as a combined feed line to the second oil spraying region; and/or, (ii) the second line branch is arranged in a stator core passage region at a single continuous circumferential region which includes in particular less than 20% or 10% or 5% of the stator circumference. A stator winding head cooling system which is light and/or is simple to produce can thus be supplied.

According to one embodiment, the second line branch is arranged in a stator core passage region radially outside a stator core cooling shell. A robust stator winding head cooling system with a low risk of crosstalk between different cooling lines, in particular with different coolants, can thus be supplied.

According to one embodiment, the first branch of the oil line has in the first oil spraying region and/or the second branch of the oil line has in the second oil spraying region, in each case a partially circular shape, in particular a semicircular shape, arranged in particular above the winding heads when fitted in the vehicle. In particular, in each case a plurality of oil jets are arranged on the partially circular shape, spaced apart from one another.

The outlet of oil can thus be adapted to the arrangement of the winding heads, wherein, by virtue of the influence of gravity, a formation as part of a circle about the upper circumferential half of the stator winding heads is sufficient to spray all the stator winding heads with sufficient cooling oil.

According to one embodiment, the oil jets are spaced uniformly apart from one another, uniformly along the partially circular shape. A uniform supply of cooling oil to the stator winding heads can thus be ensured.

According to one embodiment, the first and the second line branch has in each case a bent hollow tube at least in the region of the partially circular shape. A stator winding head cooling system which is simple to produce and/or light can thus be supplied.

According to one embodiment, the bent hollow tube is in each case arranged spaced apart, with respect to a stator center axis, from a stator sleeve and/or a stator receptacle of a housing shell. The stator winding head cooling system can consequently be positioned axially for optimal cooling performance.

Axially means in the present case in particular a reference to the stator center axis, as it were the rotor axis of rotation of the electric drive motor of the drive unit.

According to one embodiment, the oil line has: (A) a third line branch which branches off from the first or the second line branch and is configured to route cooling oil to a third oil spraying region at a gearing of an output transmission of the electric drive unit; and/or, (B) a fourth line branch which branches off from the first, the second, or the third line branch and is configured to route cooling oil to a fourth oil spraying region at a further gearing of the output transmission and/or to a fifth oil spraying region at a rotor end face of the electric drive unit and/or to a sixth oil spraying region at a differential gear unit of the output transmission of the electric drive unit.

A very extensive stator core periphery in the sense of multiple or all the moving components in the housing interior of a housing of the drive unit can thus be cooled, in each case directly, using a single oil pump.

According to one embodiment, the oil line is constructed from a plurality of hollow tubes which are connected to one another, in particular at the branching points of the individual line branches, by way of plug-on distributors.

According to one embodiment, a switchable valve, which can release or block a cooling oil mass flow in one or both branches, is arranged at a distribution point between two line branches.

In particular, this is advantageous when the third line branch for supplying the components of the output transmission branches off, such that the stator winding heads can then be cooled independently of these components of the output transmission if the third line branch is blocked.

In the present case, the term spray oil is used in particular when cooling oil is sprayed from the oil line onto a component to be cooled and/or lubricated.

BRIEF DESCRIPTION OF THE DRAWINGS

Further advantages and possible applications of the disclosure can be found in the following description in conjunction with the figures.

DETAILED DESCRIPTION OF THE DRAWINGS

Figure 1:
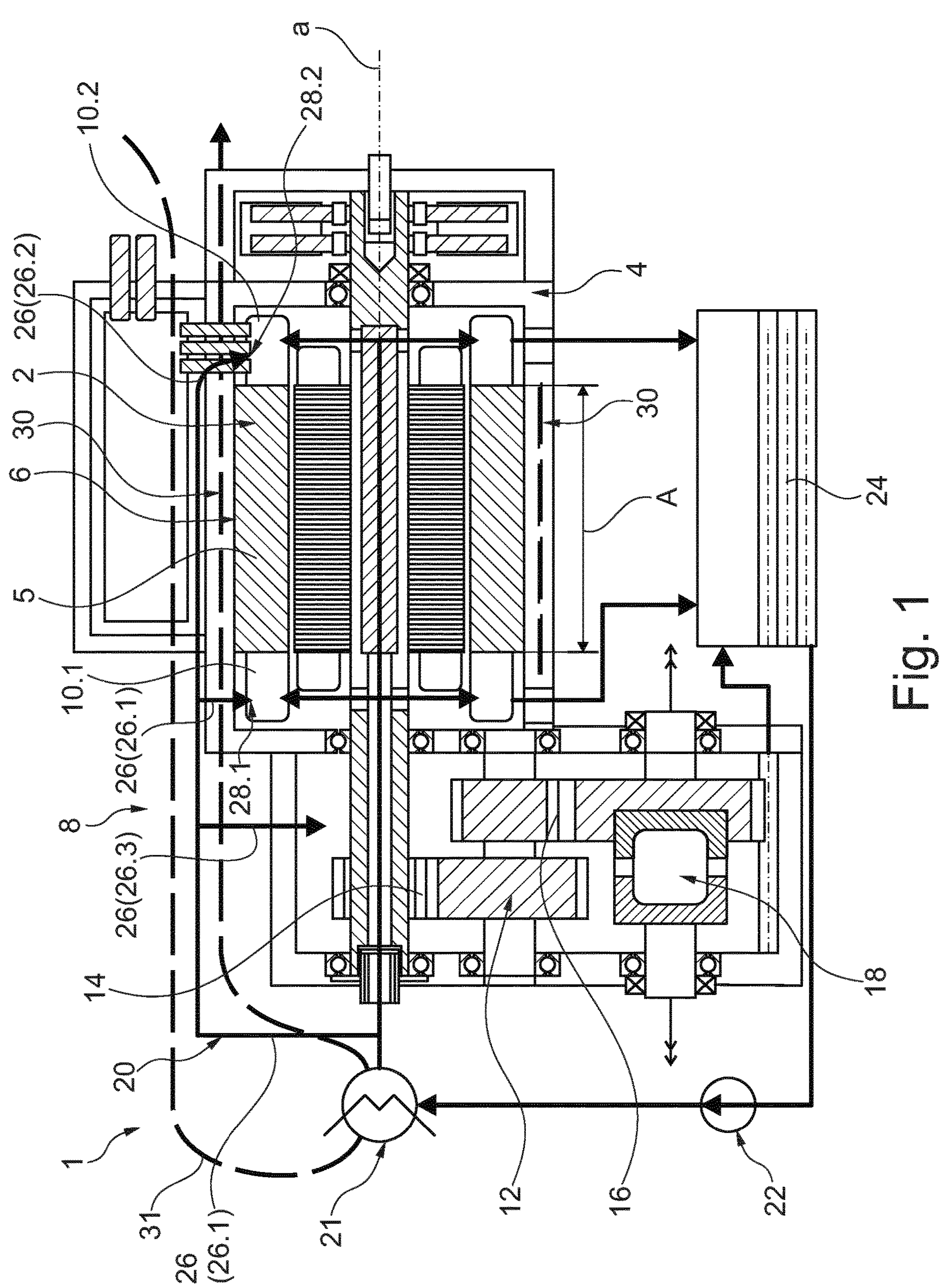
FIG. 1 shows an abstract schematic view of a drive unit according to an exemplary embodiment of the disclosure.

Illustrated in FIG. 1 is an electric drive unit 1 for a motor vehicle, having an electric drive motor 2 and a stator housing 4 inside which a stator core 5 of a stator 6 and a stator core periphery 8 of the electric drive motor 2 are arranged.

The stator core periphery 8 here comprises the winding heads 10.1 and 10.2 of the stator 6, and an output transmission 12 of the electric drive unit 1. The output transmission 12 has a first gearing 14 and a second gearing 16 and a differential gear unit 18.

In addition, the electric drive unit 1 has a spray oil cooling device 20 for the stator core periphery.

The spray oil cooling device 20 has an oil pump 22 for supplying a cooling oil mass flow of cooling oil 24, and additionally an oil line 26 for routing the cooling oil mass flow starting from the oil pump to a first oil spraying region 28.1 at stator winding heads 10.1 of a first stator end side and a second oil spraying region 28.2 at stator winding heads 10.2 of a second stator end side. The oil line 26 is configured to route the cooling oil mass flow between the first oil spraying region 28.1 and the second oil spraying region 28.2 away from a stator core cooling shell 30 through which water flows.

Figure 2:
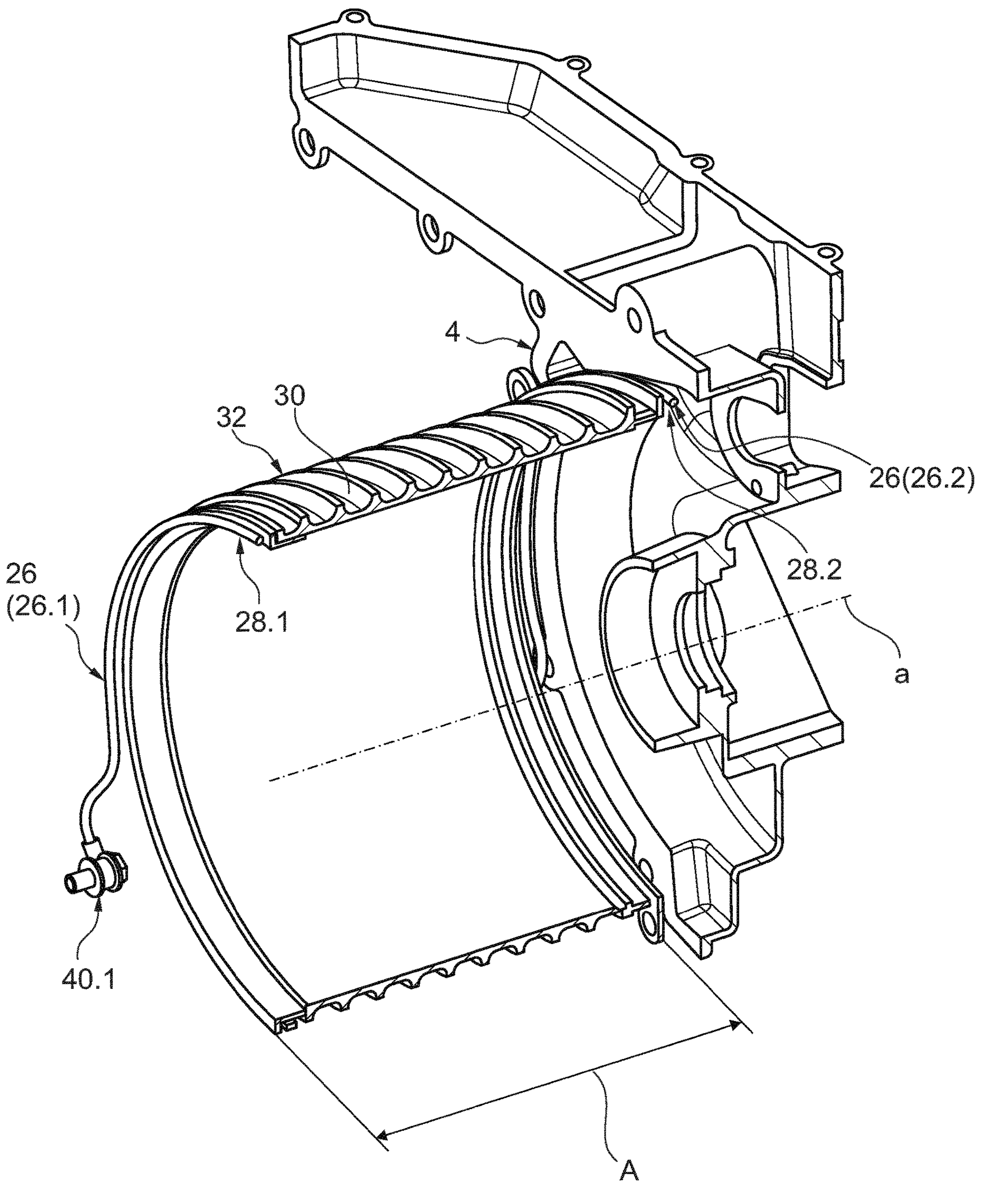
FIG. 2 shows a portion of a drive unit according to an exemplary embodiment of the disclosure in a perspective view in section.

The oil line 26 in the present case forms, with a water feed line 31 of the stator core cooling shell 30, an oil/water heat exchanger 21. The stator core cooling shell 30 can be formed in the stator housing 4 itself (as in the exemplary embodiment of FIG. 1) or in an outer shell of a stator sleeve 32 which, together with an inner shell of the stator housing 4, delimits the stator core cooling shell 30 and which receives the stator on its inner shell (as in the exemplary embodiment of FIG. 2).

Because the stator core cooling shell 30, on one hand, and the oil line 26 of the spray oil cooling device 20, on the other hand, are configured as separate, partial load cooling (primarily over the stator core 5) and full load cooling (additionally over the stator core periphery 8) can be decoupled. This decoupling can be clearly seen in a specific exemplary design in FIG. 2.

The oil line 26 has a first line branch 26.1 which is configured to route cooling oil 24 from the oil pump 22 to the first oil spraying region 28.1.

The oil line 26 moreover has a second line branch 26.2 which branches off from the first line branch 26.1 and is configured to route cooling oil 24 to the second oil spraying region 28.2 through an axial region A of the stator core 5, wherein the second line branch 26.2, where it passes the axial region A of the stator core 5, is designed as a hollow tube with a wall thickness which is less than the cross-section of the oil line 26 in the second line branch 26.2. A weight-optimized embodiment of the second line branch can thus be supplied.

The second line branch 26.2 is, where it passes the axial region A of the stator core 5, designed as a combined feed line to the second oil spraying region and is therefore arranged in this axial region at a single continuous circumferential region which includes less than 5% of the stator circumference. A stator winding head cooling system which is light and/or is simple to produce can thus be supplied.

The second line branch 26.2 is arranged in a stator core passage region (axial region A of the stator core) radially outside the stator core cooling shell 30. A robust stator winding head cooling system with a low risk of crosstalk between different cooling lines, in particular with different coolants, here water and oil, can thus be supplied.

The first line branch 26.1 of the oil line 26 has, in the first oil spraying region 28.1 (as well as the second line branch 26.2 in the second oil spraying region 28.2), a semicircular shape formed in the upper semicircle of the stator circumference around the winding heads 10.1 or 10.2. In each case a plurality of oil jets 34 are arranged on each of the two partially circular shapes, spaced apart from one another. The outlet of oil can thus be adapted to the arrangement of the winding heads 10.1 or 10.2, wherein, by virtue of the influence of gravity, a formation as part of a circle about the upper circumferential half of the stator winding heads is sufficient to spray all the stator winding heads with sufficient cooling oil.

The oil jets 34 are in the present case uniformly spaced apart from one another along the partially circular shape. A uniform supply of cooling oil to the stator winding heads can thus be ensured.

The first line branch 26.1 and the second line branch 26.2 is designed with a bent hollow tube at least in the region of the partially circular shape. A stator winding head cooling system which is simple to produce and/or light can thus be supplied. The bent hollow tube is in each case arranged spaced apart from the stator sleeve 32 of the exemplary embodiment of FIGS. 2 and 3 or from a stator receptacle of the housing shell of the stator housing 4 of the exemplary embodiment of FIG. 1 with respect to a stator center axis a (e.g., rotor axis of rotation). The stator winding head cooling system can consequently be positioned axially for optimum cooling performance.

Figure 3:
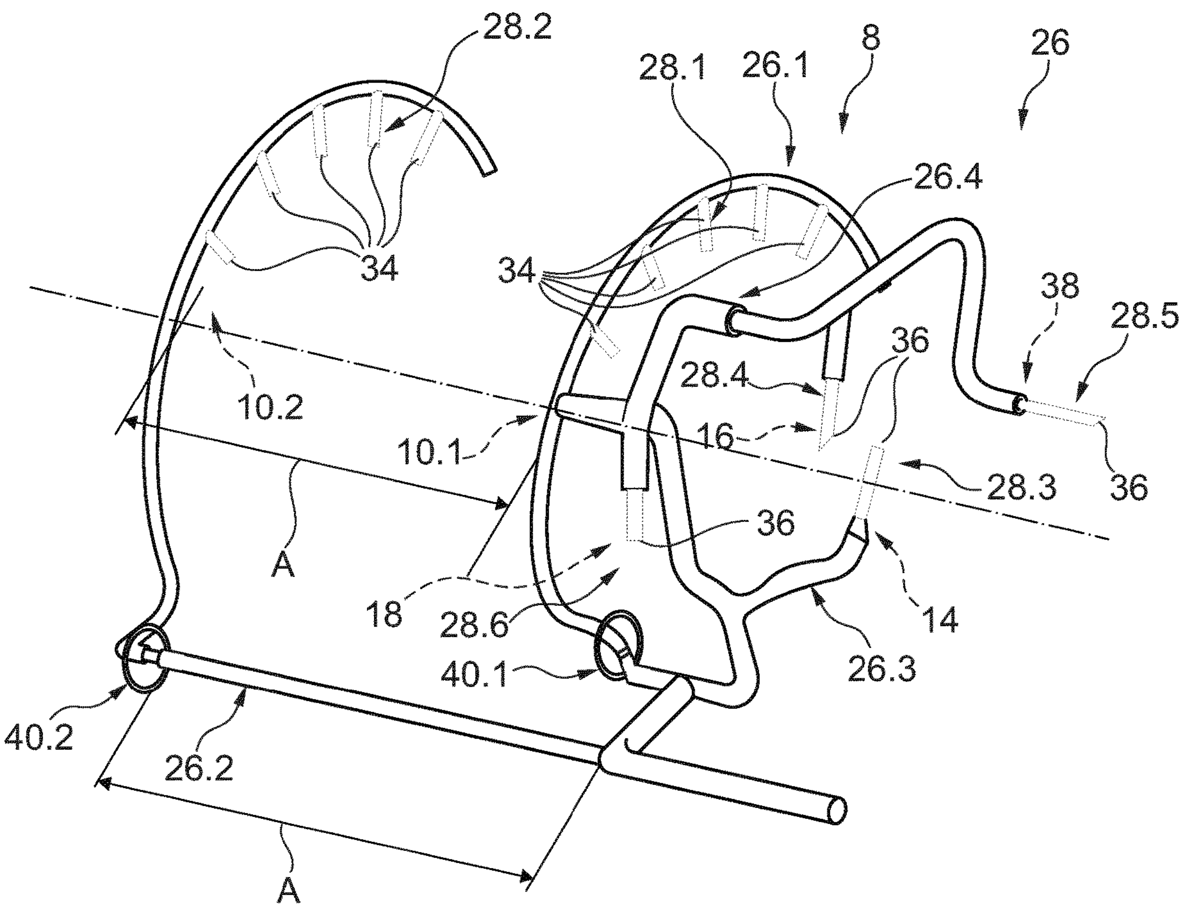
FIG. 3 shows an oil line of a spray oil cooling device of the drive unit from FIG. 2 in a schematic perspective view.

Illustrated in FIG. 3 is the oil line 26 with all the branches after the oil/water heat exchanger 31.

The oil line 26 has a third line branch 26.3 which branches off from the second line branch 26.2 and is configured to route cooling oil to a third oil spraying region 28.3 at a gearing 14 of the output transmission 12. The cooling oil is here sprayed on by a single oil jet 36.

The oil line has a fourth line branch 26.4 which branches off from the third line branch 26.3 and is configured to route cooling oil to a fourth oil spraying region 28.4 at a further gearing 16 of the output transmission 12 and to a fifth oil spraying region 28.5 at a rotor end face 38 of the electric drive unit 1 and to a sixth oil spraying region 28.6 at a differential gear unit 18. A very extensive stator core periphery 8 can thus be cooled directly using a single oil pump 22. The cooling oil is sprayed in each case by a single oil jet 36.

The oil line is constructed from a plurality of hollow tubes which are connected to one another at the branching points of the individual line branches by way of plug-on distributors 40.

The oil line 26 is designed in both exemplary embodiments as a tube separate from the stator housing 4 and the stator sleeve 32 and the stator core 5. The line cross-section of the oil line 26 thus, at least apart from connection points or wall openings, is not excluded from the stator housing 4 or the stator sleeve 32 or the stator core 5.

By separating media in the different cooling circuits 30 with 31 for the stator core and 26 with 34 for the stator core periphery 8 arranged in the housing interior of the drive unit, the risk of crosstalk can be reduced, which is relevant in particular in the case of the use of different coolants, for example pressurized oil and water, because otherwise irreparable damage can occur. Simplified installation is also connected therewith, in particular by a reduction in the forces needed to install a stator sleeve which may be used as in the exemplary embodiment in FIG. 2, depending on the design, by virtue of avoiding the use of additional O-rings for sealing.

In addition, routing the oil line 26 in tubes 26.1, 26.2, 26.3, and 26.4 is the better solution in terms of a low overall weight of the drive unit 1, compared with a formation in the housing 4, because routing in the housing 4 entails a higher wall thickness and hence material requirement, possibly even a greater housing dimension.

LIST OF REFERENCE SIGNS electric drive unit 1
electric drive motor 2
stator housing 4
stator core 5
stator 6
stator core periphery 8
first winding heads (here, side A) 10.1
second winding heads (here, side B) 10.2
output transmission 12
first gearing 14
second gearing 16
differential gear unit 18
spray oil cooling device 20
oil/water heat exchanger 21
oil pump 22
cooling oil 24
oil line 26
oil spraying region 28
stator core cooling shell 30
water feed line 31
stator sleeve 32
oil jets 34
oil jets 36
rotor end face 38
plug-on distributor 40
rotor axis of rotation a
axial region A

The invention claimed is:

1. A spray oil cooling device for a stator core periphery of an electric drive unit in a motor vehicle, comprising:

an oil pump for supplying a mass flow of a cooling oil, and an oil line for routing the cooling oil starting from the oil pump to a first oil spraying region at first stator winding heads, and a second oil spraying region at second stator winding heads, wherein the oil line routes the cooling oil between the first and the second oil spraying region away from a stator core cooling shell, wherein the oil line comprises:

a first line branch which routes cooling oil from the oil pump to the first oil spraying region, and a second line branch which branches off from the first line branch and routes cooling oil to the second oil spraying region through an axial region of the stator core, wherein the second line branch is designed, in the axial region or completely, as a hollow tube with a wall thickness which is less than the cross-section of the oil line in the second line branch.

2. The spray oil cooling device according to claim 1, wherein the oil line comprises a tube separate from a stator housing and/or a stator sleeve and/or the stator core.

3. The spray oil cooling device according to claim 1, wherein the second line branch, in the axial region of the stator core, runs as a combined feed line to the second oil spraying region, and/or is arranged at a single continuous circumferential region which includes less than 20% of the stator circumference.

4. The spray oil cooling device according to claim 1, wherein the second line branch is arranged in the axial region of the stator core radially outside the stator core cooling shell.

5. The spray oil cooling device according to claim 1, wherein the first line branch of the oil line has, in the first oil spraying region and the second line branch of the oil line in the second oil spraying region, in each case a partially circular shape, and a plurality of oil jets are arranged on the partially circular shape, spaced apart from one another.

6. The spray oil cooling device according to claim 5, wherein the oil jets are spaced uniformly apart from one another, uniformly along the partially circular shape.

7. The spray oil cooling device according to claim 5, wherein the first and the second line branch has in each case a bent hollow tube at least in the region of the partially circular shape.

8. The spray oil cooling device according to claim 7, wherein the bent hollow tube is in each case arranged spaced apart, with respect to a stator center axis, from a stator sleeve and/or a stator receptacle of a housing shell of the stator housing.

9. The spray oil cooling device according to claim 1, wherein the oil line comprises: a third line branch which branches off from the first or the second line branch and routes cooling oil to a third oil spraying region at a gearing of an output transmission of the electric drive unit; and/or a fourth line branch which branches off from the first, the second, or the third line branch and routes cooling oil to a fourth oil spraying region at a further gearing of the output transmission and/or to a fifth oil spraying region at a rotor end face of the electric drive unit and/or to a sixth oil spraying region at a differential gear unit of the output transmission of the electric drive unit.

10. The spray oil cooling device according to claim 1, wherein the oil line is constructed from a plurality of hollow tubes which are connected to one another by way of plug-on distributors.

11. The spray oil cooling device according to claim 1, wherein a switchable valve, which can release or block a cooling oil mass flow in one or both branches, is arranged at a distribution point between two line branches.

12. An electric drive unit for a motor vehicle, having an electric drive motor and a stator housing inside which a stator core and a stator core periphery of the electric drive motor are arranged, comprising a spray oil cooling device according to claim 1.

13. The electric drive unit according to claim 12, wherein the stator core periphery comprises the winding heads of the stator and/or an output transmission of the electric drive unit, and the spray oil cooling device cools the stator core periphery by way of a cooling oil.

14. The electric drive unit according to claim 13, wherein the output transmission has a first gearing and/or a second gearing and/or a differential gear unit.

15. The spray oil cooling device according to claim 1, wherein the oil line forms, with a water feed line of the stator core cooling shell, an oil/water heat exchanger.

16. The spray oil cooling device according to claim 1, wherein the stator core cooling shell is a stator core cooling shell through which water flows.

17. The spray oil cooling device according to claim 5, wherein the partially circular shape is a semicircular shape formed in an upper semicircle of a stator circumference around the winding heads.

18. The spray oil cooling device according to claim 9, wherein the third line branch branches off from the second line branch.

19. The spray oil cooling device according to claim 3, wherein the single continuous circumferential region includes less than 5% of the stator circumference.

* * * * *